United States Patent
Ohnishi

(10) Patent No.: US 11,932,730 B2
(45) Date of Patent: Mar. 19, 2024

(54) POLYARYLENE SULFIDE RESIN COMPOSITION, MOLDED ARTICLE, AND OPTICAL FERRULE

(71) Applicant: Polyplastics Co., Ltd., Tokyo (JP)

(72) Inventor: Katsuhei Ohnishi, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 0 days.

(21) Appl. No.: 18/258,664

(22) PCT Filed: Dec. 6, 2021

(86) PCT No.: PCT/JP2021/044776
§ 371 (c)(1),
(2) Date: Oct. 26, 2023

(87) PCT Pub. No.: WO2022/138118
PCT Pub. Date: Jun. 30, 2022

(65) Prior Publication Data
US 2024/0043620 A1    Feb. 8, 2024

(30) Foreign Application Priority Data
Dec. 25, 2020  (JP) ................................ 2020-217122

(51) Int. Cl.
*G02B 6/38*  (2006.01)
*C08G 75/0204*  (2016.01)
*C08K 3/36*  (2006.01)

(52) U.S. Cl.
CPC ............ *C08G 75/0204* (2013.01); *C08K 3/36* (2013.01); *G02B 6/38* (2013.01); *C08K 2201/005* (2013.01); *C08K 2201/014* (2013.01)

(58) Field of Classification Search
CPC ........ G02B 6/38; C08G 75/0204; C08K 3/36; C08K 2201/005; C08K 2201/014

USPC ......................................................... 524/493
See application file for complete search history.

(56) References Cited

U.S. PATENT DOCUMENTS

| | | | | |
|---|---|---|---|---|
| 6,395,818 B1 * | 5/2002 | Murakami | ............... | G02B 1/04 524/492 |
| 2002/0055582 A1 * | 5/2002 | Murakami | .............. | C08L 81/02 524/492 |

FOREIGN PATENT DOCUMENTS

| | | |
|---|---|---|
| EP | 0588591 A1 | 3/1994 |
| EP | 1038922 A2 | 9/2000 |
| EP | 1065246 A1 | 1/2001 |
| JP | H06-184442 A | 7/1994 |
| JP | 2000-204252 A | 7/2000 |
| JP | 2000-273304 A | 9/2000 |
| JP | 2007-154071 A | 6/2007 |
| JP | 2017-500404 A | 1/2017 |
| JP | 2019-183156 A | 10/2019 |
| WO | WO 02/083792 A1 | 10/2002 |
| WO | WO 2015/031233 A1 | 3/2015 |

* cited by examiner

*Primary Examiner* — Kelechi C Egwim
(74) *Attorney, Agent, or Firm* — Knobbe, Martens, Olson & Bear, LLP

(57) ABSTRACT

A polyarylene sulfide resin composition which yields a molded article with excellent toughness, as well as a molded article and an optical ferrule, which are produced using the polyarylene sulfide resin composition. In a polyarylene sulfide resin composition containing a polyarylene sulfide resin and silica particles, a specific amount of a polyarylene sulfide resin having a melt viscosity of 35 to 80 Pa·s, and a specific amount of silica particles having a lower content of coarse powders with a particle size of 45 μm or more are employed.

6 Claims, No Drawings

POLYARYLENE SULFIDE RESIN COMPOSITION, MOLDED ARTICLE, AND OPTICAL FERRULE

This application is the U.S. National Phase under 35 U.S.C. § 371 of International Application PCT/JP2021/044776, filed Dec. 6, 2021, designating the U.S., and published in Japanese as WO 2022/138118 on Jun. 30, 2022, which claims priority to Japanese Patent Application No. 2020-217122, filed Dec. 25, 2020, the entire content of which is incorporated herein by reference.

TECHNICAL FIELD

The present invention relates to a polyarylene sulfide resin composition, a molded article, and an optical ferrule.

BACKGROUND ART

Polyarylene sulfide resins typified by polyphenylene sulfide resins have excellent heat resistance, mechanical physical properties, chemical resistance, dimensional stability, and flame retardance. For this reason, the polyarylene sulfide resins have been widely used for electric/electronic device component materials, automotive equipment component materials, chemical equipment component materials, etc., in particular, in applications involving high usage environment temperatures.

Examples of known applications of such polyarylene sulfide resins include the molding of optical ferrules that constitute a connector for optical fibers. Molding materials of the optical ferrules are required to have excellent dimensional stability, mechanical properties, flame retardance, etc.

An example of known polyarylene sulfide resin compositions suitable for use in molding of the optical ferrules is a polyarylene sulfide resin composition containing a specific amount of a polyarylene sulfide resin (A) having a crystallization temperature of 250° C. or higher as measured using a differential scanning calorimeter, and a specific amount of silica (B) (see Patent Document 1).

Patent Document 1: Japanese Unexamined Patent Application, Publication No. 2000-273304

DISCLOSURE OF THE INVENTION

Problems to be Solved by the Invention

The amount of information communicated in information communication terminals used through the connection to an optical communication network is increasing each day. Thus, the number of cores, which is the number of optical fibers, in the optical ferrules tend to be increased to address the increase in amount of information communication. The increase in number of cores in the optical ferrules leads to insufficient strength of the optical ferrules in the processing thereof and the coupling thereof to an adapter. Under such circumstances, the polyarylene sulfide resin compositions are required to undergo a further improvement in mechanical strength such as toughness.

The present invention takes the above circumstances into consideration, with an object of providing a polyarylene sulfide resin composition which yields a molded article with excellent toughness, as well as a molded article and an optical ferrule, which are produced using the polyarylene sulfide resin composition.

Means for Solving the Problems

The present inventors found that the above-mentioned problems can be solved by a polyarylene sulfide resin composition containing a polyarylene sulfide resin (A) and silica particles (B), in which a specific amount of a polyarylene sulfide resin (A) having a melt viscosity of 35 to 80 Pas, and a specific amount of silica particles (B) having a lower content of coarse powders with a particle size of 45 µm or more are used, thus completing the present invention. More specifically, the present invention provides the following.

A first aspect of the present invention relates to a polyarylene sulfide resin composition including a polyarylene sulfide resin (A) and silica particles (B), wherein the polyarylene sulfide resin (A) has a melt viscosity, as measured at a temperature of 310° C. and a shear rate of 1200 $\text{sec}^{-1}$, of 35 to 80 Pa·s, and the content of the polyarylene sulfide resin (A) is 25 to 40% by mass based on the mass of the polyarylene sulfide resin composition, the silica particles (B) include smaller-particle-size silica particles (B1) and larger-particle-size silica particles (B2), the content of the smaller-particle-size silica particles (B1) is 35 to 120 parts by mass based on 100 parts by mass of the polyarylene sulfide resin (A), the content of the larger-particle-size silica particles (B2) is 100 to 240 parts by mass based on 100 parts by mass of the polyarylene sulfide resin (A), the smaller-particle-size silica particles (B1) have a mean particle size of 1 µm or less, the larger-particle-size silica particles (B2) have a mean particle size of 2 µm or more and 10 µm or less, and in sieving a sample of the silica particles (B) in a wet process using a sieve with an opening size of 45 µm, the ratio of the mass of the silica particles (B) on the sieve to the total mass of the sample of the silica particles (B) is 10 ppm by mass or less.

A second aspect of the present invention relates to the polyarylene sulfide resin composition according to the first aspect, wherein the silica particles (B) consist of only the smaller-particle-size silica particles (B1) and the larger-particle-size silica particles (B2).

A third aspect of the present invention relates to the polyarylene sulfide resin composition according to the first or second aspect, wherein the content of the silica particles (B) is 150 to 300 parts by mass based on 100 parts by mass of the polyarylene sulfide resin (A).

A fourth aspect of the present invention relates to the polyarylene sulfide resin composition according to any one of the first to third aspects, wherein the ratio of the mass of the smaller-particle-size silica particles (B1) to the sum of the mass of the smaller-particle-size silica particles (B1) and the mass of the larger-particle-size silica particles (B2) is 14 to 43% by mass.

A fifth aspect of the present invention relates to a molded article including the polyarylene sulfide resin composition according to any one of the first to fourth aspects.

A sixth aspect of the present invention relates to an optical ferrule including one or more optical fibers, and a resin portion enveloping the one or more optical fibers, wherein the resin portion includes the polyarylene sulfide resin composition according to any one of the first to fourth aspects.

Effects of the Invention

The present invention can provide a polyarylene sulfide resin composition which yields a molded article with excellent toughness, as well as a molded article and an optical ferrule, which are produced using the polyarylene sulfide resin composition.

Preferred Mode for Carrying Out the Invention

Embodiments of the present invention will now be described. The present invention is not limited to the following embodiments.

Polyarylene Sulfide Resin Composition

A polyarylene sulfide resin composition contains polyarylene sulfide resin (A) and silica particles (B). The polyarylene sulfide resin (A) has a melt viscosity of 35 to 80 Pas. The melt viscosity is measured at a temperature of 310° C. and a shear rate of 1200 sec$^{-1}$. The content of the polyarylene sulfide resin (A) is 25 to 40% by mass based on the mass of the polyarylene sulfide resin composition. The silica particles (B) contain smaller-particle-size silica particles (B1) and larger-particle-size silica particles (B2). The content of the smaller-particle-size silica particles (B1) is 35 to 120 parts by mass based on 100 parts by mass of the polyarylene sulfide resin (A). The content of the larger-particle-size silica particles (B2) is 100 to 240 parts by mass based on 100 parts by mass of the polyarylene sulfide resin (A). The mean particle size of the smaller-particle-size silica particles (B1) is 1 μm or less. The mean particle size of the larger-particle-size silica particles (B2) is 2 μm or more and 10 μm or less. In sieving a sample of the silica particles (B) in a wet process using a sieve with an opening size of 45 μm, the ratio of the mass of the silica particles (B) on the sieve to the total mass of the sample of the silica particles (B) is 10 ppm by mass or less.

The polyarylene sulfide resin composition satisfying the requirements described above yields a molded article with excellent toughness. Therefore, the polyarylene sulfide resin composition described above is suitably used as a material for producing an optical ferrule enveloping an optical fiber.

Essential or optional components to be contained in the polyarylene sulfide resin composition and a method for producing the polyarylene sulfide resin composition will now be described.

Polyarylene Sulfide Resin (A)

The polyarylene sulfide resin (A) (hereinafter, may also be referred to as "PAS resin") is a polymer compound composed mainly of, as a repeating unit, —(Ar—S)—, wherein "Ar" represents an arylene group. In the present embodiment, a PAS resin of a commonly known molecular structure may be used.

The arylene group is not particularly limited, and examples thereof include a p-phenylene group, an m-phenylene group, an o-phenylene group, a substituted phenylene group, a p,p'-diphenylene sulfone group, a p,p'-biphenylene group, a p,p'-diphenylene ether group, a p,p'-diphenylene carbonyl group, a naphthalene group, and the like. Among polymers incorporating arylene sulfide groups including such arylene groups, homopolymers including repeating units of the same type of the arylene sulfide group, as well as polymers including repeating units of different types of the arylene sulfide groups are preferred, depending on applications.

As the homopolymer, a homopolymer including repeating units of a p-phenylene sulfide group as the arylene group is preferred, depending on applications. The homopolymer including repeating units of the p-phenylene sulfide group has extremely high heat resistance, and exhibits high strength and high stiffness as well as high dimensional stability over a wide range of temperatures. Use of such a homopolymer can yield a molded article having very excellent physical properties.

In the copolymer, a combination of two or more types of different arylene sulfide groups among the arylene sulfide groups including the above-mentioned arylene groups may be used. Among these, a combination including a p-phenylene sulfide group and an m-phenylene sulfide group is preferred from the viewpoints that a molded article excellent in physical properties such as heat resistance, moldability, and mechanical properties can be obtained. Furthermore, a polymer including a p-phenylene sulfide group in a proportion of 70 mol % or more is more preferred, and a polymer including a p-phenylene sulfide group in a proportion of 80 mol % or more is even more preferred. Incidentally, a PAS resin having a phenylene sulfide group is referred to as a polyphenylene sulfide resin (hereinafter, may also be referred to as "PPS resin"). Among these PAS resins, a high molecular weight polymer which is obtained from monomers principally including bifunctionally-halogenated aromatic compounds through condensation polymerization and has a substantially linear structure may be used particularly preferably. The PAS resin used in the present embodiment may be a mixture of two or more types of PAS resins having different molecular weights. Polymers partially having a branched or cross-linked structure formed in condensation polymerization by using a small amount of a monomer such as a polyhalogenated aromatic compound having three or more halogen substituents, and polymers obtained by heating a linear structure polymer with a low molecular weight in the presence of oxygen or the like at an elevated temperature to increase the melt viscosity thereof via oxidative crosslinking or thermal crosslinking and to improve the molding processability thereof are also mentioned in addition to the PAS resin having linear structure.

The PAS resin may be produced by conventionally known polymerization methods. The PAS resin produced by a common polymerization method is usually washed with water or acetone several times in order to remove by-product impurities and the like. In addition, the PAS resin may be subsequently washed further with acetic acid, ammonium chloride, or the like.

In regard to the melt viscosity as measured at a temperature of 310° C. and a shear rate of 1200 sec$^{-1}$ (hereinafter, simply referred to as "melt viscosity"), the PAS resin (A), including the case of the mixture system described above, exhibits a melt viscosity of 35 to 80 Pas. For the mixture system, it is sufficient that the melt viscosity of the PAS resin system after the mixing falls within the range described above. The PAS resin (A) has a melt viscosity of preferably 40 to 75 Pa·s, and more preferably 45 to 70 Pas from the viewpoint of the balance between a high level of tensile strain at break of the PAS resin (A) and excellent fluidity of the PAS resin composition. The melt viscosity of the PAS resin (A) can be adjusted, for example, by a method which involves the adjustment of the molecular weight by adjusting polymerization conditions, or a method which involves the introduction of crosslinking into the molecular chain through the use of a polyfunctional monomer and/or a process such as thermal oxidative crosslinking.

When the PAS resin (A) contains two or more types of PAS resins, the two or more types of PAS resins may be mixed beforehand through a procedure such as melt-kneading before the preparation of the resin composition. The two or more types of PAS resins may be separately mixed with silica particles (B) into homogeneous matter prior to the preparation of the PAS resin composition.

The content of the PAS resin (A) is 25 to 40% by mass, preferably 26 to 38% by mass, and more preferably 27 to 35% by mass based on the mass of the PAS resin composition. When the PAS resin composition contains the PAS resin (A) in an amount falling within such a range, a PAS resin composition having both desired mechanical properties and favorable moldability is likely to be obtained.

Silica Particles (B)

The silica particles (B) contain smaller-particle-size silica particles (B1) and larger-particle-size silica particles (B2). The content of the smaller-particle-size silica particles (B1) is 35 to 120 parts by mass based on 100 parts by mass of the PAS resin (A). The content of the larger-particle-size silica particles (B2) is 100 to 240 parts by mass based on 100 parts by mass of the PAS resin (A). The mean particle size of the smaller-particle-size silica particles (B1) is 1 μm or less. The mean particle size of the larger-particle-size silica particles (B2) is 2 μm or more and μm or less. In sieving a sample of the silica particles (B) in a wet process using a sieve with an opening size of 45 μm, the ratio of the mass of the silica particles (B) on the sieve to the total mass of the sample of the silica particles (B) is 10 ppm by mass or less.

Various conventionally known silica particles may be used as the silica particles (B) so long as they satisfy the above-mentioned requirements. However, in regard to the silica particles (B), in sieving a sample of the silica particles (B) in a wet process using a sieve with an opening size of 45 μm, the ratio of the mass of the silica particles (B) on the sieve to the total mass of the sample of the silica particles (B) is ppm by mass or less, preferably 7 ppm by mass or less, more preferably 5 ppm by mass or less, and even more preferably 3 ppm by mass or less.

Preferred examples of the silica particles (B) include silica powders produced by a method which involves the formation of spherical silica powders in a reaction vessel having a build-in burner by means of the heat of combustion of the burner. Examples of known methods for producing such silica powders include a method which involves the deflagration of metal silicon powders, a flame hydrolysis method, a flame fusion method, and the like. The so-called colloidal silica produced by a wet process may also be used as the silica particles (B).

However, the silica particles (B) produced by such methods inevitably contain coarse particles. The present inventors have studied in view of this point, and found that coarse particles included in the silica particles in the PAS resin composition containing the silica particles adversely affect the mechanical properties of molded articles of the PAS resin composition.

A method for reducing the content of coarse powders having a particle size of more than 45 μm in the silica particles (B) is not particularly limited. Typical methods include sieving. The sieving may be performed either in a dry process or a wet process. Classification with airflow is also applicable as a method for removing coarse powder from the silica particles (B).

The silica particles (B) contain the smaller-particle-size silica particles (B1) and the larger-particle-size silica particles (B2). The mean particle size of the smaller-particle-size silica particles (B1) is 1 μm or less. The mean particle size of the larger-particle-size silica particles (B2) is 2 μm or more and 10 μm or less. The silica particles (B) may contain other silica particles (B3) corresponding to neither the smaller-particle-size silica particles (B1) nor the larger-particle-size silica particles (B2), so long as the desired effect is not impaired. The ratio of the sum of the mass of the smaller-particle-size silica particles (B1) and the mass of the larger-particle-size silica particles (B2) to the mass of the silica particles (B) is preferably 80% by mass or more, more preferably 90% by mass or more, even more preferably 95% by mass or more, and particularly preferably 100% by mass. In other words, the silica particles (B) preferably consist of only the smaller-particle-size silica particles (B1) and the larger-particle-size silica particles (B2).

The mean particle sizes of the smaller-particle-size silica particles (B1) and the larger-particle-size silica particles (B2) refer to the median diameter at a cumulative value of 50% in the particle size distribution as measured by a laser diffraction/scattering method.

With regard to the silica particles (B) as a whole, it is necessary that, in sieving a sample of the silica particles (B) in a wet process using a sieve with an opening size of 45 μm, the ratio of the mass of the silica particles (B) on the sieve to the total mass of the sample of the silica particles (B) is 10 ppm by mass or less. For the smaller-particle-size silica particles (B1), when the ratio of the mass of the coarse particles having a particle size of more than 45 μm is measured according to the above-mentioned method, the ratio of the mass of the smaller-particle-size silica particles (B1) on the sieve to the total mass of the sample of the smaller-particle-size silica particles (B1) may be more than 10 ppm by mass, but is preferably 10 ppm by mass or less, more preferably 7 ppm by mass or less, even more preferably 5 ppm by mass or less, and particularly preferably 3 ppm by mass or less. For the larger-particle-size silica particles (B2), when the ratio of the mass of the coarse particles having a particle size of more than 45 μm is measured according to the above-mentioned method, the ratio of the mass of the larger-particle-size silica particles (B2) on the sieve to the total mass of the sample of the larger-particle-size silica particles (B2) is preferably 10 ppm by mass or less, more preferably 7 ppm by mass or less, even more preferably 5 ppm by mass or less, and particularly preferably 3 ppm by mass or less.

More specifically, the method for determining the ratio of the coarse particles having a particle size of more than 45 μm to the mass of the silica particles (B) preferably involves the steps 1) to 6) described below. An aqueous ethylene glycol solution at a concentration of 5% by mass, for example, may be used as a dispersion medium. The amount of the dispersion medium used is not particularly limited so long as the sample of the silica particles (B) can be favorably dispersed in the dispersion medium. In dispersing the silica particles (B) in the dispersion medium, a vessel containing the silica particles (B) and the dispersion medium may be shaken, and/or ultrasound may be applied to the vessel.

1) weighing 100 g of a sample of the silica particles (B);
2) dispersing 100 g of the sample of the silica particles (B) in a dispersion medium in a vessel;
3) pouring 100 g of the sample of the silica particles (B) dispersed in the dispersion medium onto a sieve with an opening size of 45 μm;
4) applying ultrasound to the sieve to loosen aggregates of the silica particles, while allowing silica particles having a particle size of 45 μm or less to pass through the sieve;
5) drying the sieve in a drying oven, with coarse silica particles having a particle size of more than 45 μm attached onto the sieve; and
6) measuring the mass W (g) of the coarse silica particles attached onto the dried sieve.

The coarse particle ratio (ppm by mass), which is the ratio of the coarse particles having a particle size of more than 45 μm to the mass of the silica particles (B), is calculated according to the following equation using the value of W measured according to the method described above.

coarse particle ratio(ppm by mass)=$W/100 \times 1000000$

The ratio of the mass of the smaller-particle-size silica particles (B1) to the sum of the mass of the smaller-particle-size silica particles (B1) and the mass of the larger-particle-size silica particles (B2) is preferably 14 to 43% by mass, more preferably 16 to 40% by mass, and even more preferably 20 to 35% by mass.

The content of the silica particles (B) in the PAS resin composition is not particularly limited so long as the content of the smaller-particle-size silica particles (B1) and the content of the larger-particle-size silica particles (B2) satisfy the requirements mentioned above. The content of the silica particles (B) is preferably 150 to 300 parts by mass, more preferably 170 to 290 parts by mass, and even more preferably 200 to 270 parts by mass based on 100 parts by mass of the PAS resin (A) from the viewpoint of the mechanical strength of the PAS resin composition and the dimensional accuracy thereof in the molding.

Other Components

The PAS resin composition may contain, apart from the components described above, additives such as inorganic filler other than the silica particles (B), organic filler, a flame retardant, a crystallization accelerator, a crystal nucleating agent, various antioxidants, an ultraviolet absorbent, a heat stabilizer, a light stabilizer, a weatherability stabilizer, a corrosion inhibitor, a coloring agent such as a dye and a pigment, a toughness improver such as carbon black and a silane coupling agent, a release agent, a lubricant, and a plasticizer in order to impart the desired physical properties, so long as the desired effect is not inhibited. From the viewpoint of the precision moldability of the PAS resin composition as well as mechanical properties and anisotropy of a molded article containing the PAS resin composition, it is preferred that the PAS resin composition contains neither inorganic fillers other than the silica particles (B), nor organic filler.

Method for Producing PAS Resin Composition

A method for producing a PAS resin composition is not particularly limited and may be appropriately selected from conventionally known methods for producing a resin composition so long as components of this resin composition can be uniformly mixed. Examples thereof include a method in which components are melt kneaded and extruded with a melt kneading device such as a single or twin screw extruder, and then the resultant resin composition is processed into a desired form such as powder, flake, and pellet.

Molded Article

A molded article contains the above-mentioned PAS resin composition. The molded article may be produced from the above-mentioned PAS resin composition by any known molding method such as injection molding, extrusion molding, etc.

Optical Ferrule

An optical ferrule includes one or more optical fibers, and a resin portion enveloping the one or more optical fibers, and the resin portion contains the PAS resin composition described above. For the resin portion in such an optical ferrule, there may be a thin portion having a thickness of about several hundred micrometers in places such as a place between the optical fibers. However, the PAS resin composition described above yields a molded article excellent in mechanical properties such as tensile strain at break. The PAS resin composition also has excellent fluidity. Therefore, the forming of the above-mentioned resin portion using the PAS resin composition described above allows for the production of an optical ferrule excellent in dimensional accuracy and strength. The shape and size of the optical ferrule are not particularly limited. The size of a typical optical ferrule is 3 mm×7 mm×8 mm. The optical ferrule is typically produced by insert molding using the PAS resin composition described above with the optical fiber as an insert material. In forming the optical ferrule in this manner, end faces where the optical fiber is exposed are usually polished, and then two optical ferrules are pressed and coupled such that the fibers are brought into contact with one another. In optical ferrules, 4 to 12 cores have conventionally been contained in a 3 mm×7 mm surface; the number of cores in the optical ferrule has been increased, and has reached 24 or more in recent years. In general, as the number of cores of the optical fiber is increased, the strength of the optical ferrule is degraded; therefore, in particular, in the case of an optical ferrule having a large number of cores, a resin material having higher toughness is required in order to avoid breakage at the time of coupling. Since the PAS resin composition described above is excellent in toughness, the processing of an optical ferrule and the coupling thereof to an adaptor can be satisfactorily achieved even when the optical ferrule has an increased number of cores.

EXAMPLES

The present embodiments will now be specifically described with reference to Examples and Comparative Examples, but the present embodiments are not limited to these Examples.

Examples 1 to 9, and Comparative Examples 1 to 3

In Examples and Comparative Examples, the following materials were used as materials for PAS resin compositions.

Component (A): PAS Resin

A1: PPS resin, FORTRON KPS (manufactured by Kureha Corporation, melt viscosity: 20 Pas (shear rate: 1200 $sec^{-1}$ at 310° C.))

A2: PPS resin, FORTRON KPS (manufactured by Kureha Corporation, melt viscosity: 30 Pas (shear rate: 1200 $sec^{-1}$ at 310° C.))

A3: PPS resin, FORTRON KPS (manufactured by Kureha Corporation, melt viscosity: 130 Pas (shear rate: 1200 $sec^{-1}$ at 310° C.)

Measurement of Melt Viscosity of PPS Resin

The melt viscosity at a barrel temperature of 310° C. and a shear rate of 1200 $sec^{-1}$ was measured using Capilograph manufactured by Toyo Seiki Seisaku-sho, Ltd. A flat die of 1 mmφ×20 mmL was used as a capillary. The results are shown in Table 1.

Component: Silica Particles (B)

Smaller-particle-size silica B1 (mean particle size: 0.5 μm, percentage content of coarse powder having a particle size of more than 45 μm: 0 ppm by mass, manufactured by Admatechs Co., Ltd., ADMAFINE SC2500-SQ)

Smaller-particle-size silica B1' (mean particle size: 0.5 μm, percentage content of coarse powder having a particle size of more than 45 μm: 100 ppm by mass, manufactured by Admatechs Co., Ltd., ADMAFINE SO—C2)

Larger-particle-size silica B2 (mean particle size: 4.2 μm, percentage content of coarse powder having a particle size of more than 45 μm: 0 ppm by mass, manufactured by Denka Co., Ltd., FB-5SDC)

strain at break was 0.8% or more were determined as 0, and the cases where a value of the tensile strain at break was less than were determined as X.

Fluidity: Melt Viscosity (Pas)

The melt viscosity at a barrel temperature of 310° C. and a shear rate of 1000 sec$^{-1}$ was measured using Capilograph manufactured by Toyo Seiki Seisaku-sho, Ltd. A flat die of 1 mmφ×20 mmL was used as a capillary.

TABLE 1

| | | Example | | | | | | | | | Comparative Example | | | | | | | |
|---|---|---|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 | 6 | 7 | 8 |
| Component (A) (Parts by mass) | A1 | — | — | — | — | — | — | — | — | — | 93 | — | — | — | — | — | 93 | — |
| | A2 | 77 | 77 | 77 | 77 | 77 | 62 | 40 | 77 | 77 | — | 93 | 77 | 62 | 40 | 16 | — | 93 |
| | A3 | 23 | 23 | 23 | 23 | 23 | 38 | 60 | 23 | 23 | 7 | 7 | 23 | 38 | 60 | 84 | 7 | 7 |
| Polymer melt viscosity (Pa·s) | | 40 | 40 | 40 | 40 | 40 | 50 | 70 | 40 | 40 | 20 | 30 | 40 | 50 | 70 | 100 | 20 | 30 |
| Component (B) (Pars by mass) | B1 | 35 | 39 | 52 | 54 | 70 | 70 | 70 | 97 | 120 | — | — | — | — | — | — | 70 | 70 |
| | B1' | — | — | — | — | — | — | — | — | — | 70 | 70 | 70 | 70 | 70 | 70 | — | — |
| | B2 | 211 | 117 | 104 | 240 | 176 | 176 | 176 | 129 | 174 | 176 | 176 | 176 | 176 | 176 | 176 | 176 | 176 |
| Total content of component (B) (Parts by mass) | | 246 | 156 | 156 | 294 | 246 | 246 | 246 | 227 | 294 | 246 | 246 | 246 | 246 | 246 | 246 | 246 | 246 |
| Ratio of mass of smaller-particle-size silica particles (% by mass) | | 14.3 | 25.0 | 33.3 | 18.3 | 28.6 | 28.6 | 28.6 | 42.9 | 40.9 | 28.6 | 28.6 | 28.6 | 28.6 | 28.6 | 28.6 | 28.6 | 28.6 |
| Silane coupling agent (parts by mass) | | 1.4 | 1.0 | 1.0 | 1.6 | 1.4 | 1.4 | 1.4 | 1.3 | 1.6 | 1.4 | 1.4 | 1.4 | 1.4 | 1.4 | 1.4 | 1.4 | 1.4 |
| Tensile strain at break | % | 0.9 | 1.0 | 1.0 | 0.9 | 0.9 | 1.0 | 1.1 | 0.9 | 0.9 | 0.6 | 0.6 | 0.7 | 0.7 | 0.8 | 0.9 | 0.7 | 0.7 |
| | Determination | ○ | ○ | ○ | ○ | ○ | ○ | ○ | ○ | ○ | X | X | X | X | X | X | X | X |
| Melt viscosity | (Pa·s) | 460 | 360 | 350 | 500 | 450 | 500 | 540 | 430 | 470 | 280 | 400 | 440 | 490 | 550 | 650 | 310 | 420 |
| | Determination | ○ | ○ | ○ | ○ | ○ | ○ | ○ | ○ | ○ | ○ | ○ | ○ | ○ | ○ | X | X | X |

Other Components

Silane coupling agent (alkoxysilane compound: manufactured by Shin-Etsu Chemical Co., Ltd., KBE-903P)

Pellets of PAS resin compositions of Examples and Comparative Examples were each prepared by melt kneading the respective components in amounts specified in Table 1 in a twin screw extruder with a cylinder temperature of 320° C.

The resultant pellets of Examples and Comparative Examples were used to measure their tensile strain at break and melt viscosity according to the methods described below. The results of these measurements are shown in Table 1. It is noted that a melt viscosity of 600 Pas or less was determined as O, and a melt viscosity of more than 600 Pas was determined as X.

Measurement of Tensile Strain at Break

The pellets described above were used to prepare test pieces according to ISO 3167 (width: 10 mm; and thickness: 4 mmt) by injection molding with a cylinder temperature of 320° C. and a die temperature of 150° C. These test pieces were used to measure the tensile strain at break (%) according to ISO 527-1,2. The cases where a value of the tensile It can be seen from Examples 1 to 9 that the polyarylene sulfide resin compositions which contain the PAS resin (A) having a melt viscosity of 35 to 80 Pa·s, the smaller-particle-size silica particles (B1) having a mean particle size of 1 μm or less, and the larger-particle-size silica particles (B2) having a mean particle size of 2 μm or more and 10 μm or less in the respective predetermined amounts, in which the ratio of the mass of coarse silica particles having a particle size of 45 μm or more to the mass of the silica particles (B) is 10 ppm by mass or less, have both excellent tensile strain at break and excellent fluidity. Therefore, it can be seen that the PAS resin composition according to the present embodiment is suitable for PAS resin compositions for use in molding of optical ferrules.

The invention claimed is:

1. A polyarylene sulfide resin composition comprising a polyarylene sulfide resin (A) and silica particles (B), wherein:
   the polyarylene sulfide resin (A) has a melt viscosity, as measured at a temperature of 310° C. and a shear rate of 1200 sec$^{-1}$, of 35 to 80 Pas;
   a content of the polyarylene sulfide resin (A) is 25 to 40% by mass based on a mass of the polyarylene sulfide resin composition;

the silica particles (B) comprise smaller-particle-size silica particles (B1) and larger-particle-size silica particles (B2);
a content of the smaller-particle-size silica particles (B1) is 35 to 120 parts by mass based on 100 parts by mass of the polyarylene sulfide resin (A);
a content of the larger-particle-size silica particles (B2) is 100 to 240 parts by mass based on 100 parts by mass of the polyarylene sulfide resin (A);
the smaller-particle-size silica particles (B1) have a mean particle size of 1 μm or less;
the larger-particle-size silica particles (B2) have a mean particle size of 2 μm or more and 10 μm or less;
in sieving a sample of the silica particles (B) in a wet process using a sieve with an opening size of 45 μm, a ratio of a mass of the silica particles (B) on the sieve to a total mass of the sample of the silica particles (B) is 10 ppm by mass or less.

2. The polyarylene sulfide resin composition according to claim 1, wherein the silica particles (B) consist of only the smaller-particle-size silica particles (B1) and the larger-particle-size silica particles (B2).

3. The polyarylene sulfide resin composition according to claim 1, wherein the content of the silica particles (B) is 150 to 300 parts by mass based on 100 parts by mass of the polyarylene sulfide resin (A).

4. The polyarylene sulfide resin composition according to claim 1, wherein a ratio of a mass of the smaller-particle-size silica particles (B1) to a sum of the mass of the smaller-particle-size silica particles (B1) and a mass of the larger-particle-size silica particles (B2) is 14 to 43% by mass.

5. A molded article comprising the polyarylene sulfide resin composition according to claim 1.

6. An optical ferrule comprising one or more optical fibers, and a resin portion enveloping the one or more optical fibers, wherein
the resin portion comprises the polyarylene sulfide resin composition according to claim 1.

* * * * *

UNITED STATES PATENT AND TRADEMARK OFFICE
CERTIFICATE OF CORRECTION

PATENT NO. : 11,932,730 B2
APPLICATION NO. : 18/258664
DATED : March 19, 2024
INVENTOR(S) : Katsuhei Ohnishi It is certified that error appears in the above-identified patent and that said Letters Patent is hereby corrected as shown below:

In the Specification

Column 2, Line 4, delete "Pas," and insert -- Pa·s, --.

Column 3, Line 12 (approx.), delete "Pas." and insert -- Pa·s. --.

Column 4, Line 47, delete "Pas." and insert -- Pa·s. --.

Column 4, Line 51, delete "Pas" and insert -- Pa·s --.

Column 5, Line 20, after "and" insert -- 10 --.

Column 5, Line 32, after "is" insert -- 10 --.

Column 8, Line 47 (approx.), delete "Pas" and insert -- Pa·s --.

Column 8, Line 50, delete "Pas" and insert -- Pa·s --.

Column 8, Line 53, delete "Pas" and insert -- Pa·s --.

Column 9, Line 56 (approx.), delete "Pas" and insert -- Pa·s --.

Column 9, Line 57 (approx.), delete "Pas" and insert -- Pa·s --.

Column 10, Line 1, delete "0," and insert -- O, --.

Column 10, Line 3, after "than" insert -- 0.8% --.

Column 10, Line 6 (approx.), delete "(Pas)" and insert -- (Pa·s) --.

Signed and Sealed this
Sixteenth Day of July, 2024

Katherine Kelly Vidal
*Director of the United States Patent and Trademark Office*

CERTIFICATE OF CORRECTION (continued)
U.S. Pat. No. 11,932,730 B2

Column 9-10, Line 25 (approx.), delete "(Pars" and insert -- (Parts --.

In the Claims

Column 10, Line 64, Claim 1, delete "Pas;" and insert -- Pa·s; --.

Column 11, Line 13, Claim 1, after "less;" insert -- and --.